United States Patent
Jackson, III et al.

(10) Patent No.: US 12,145,890 B2
(45) Date of Patent: Nov. 19, 2024

(54) COATED (CORE-SHELL) NANOPARTICLES FOR NANOCOMPOSITE OPTICAL CERAMICS

(71) Applicant: Raytheon Company, Waltham, MA (US)

(72) Inventors: Richard Wesley Jackson, III, Mystic, CT (US); Kenneth D. Smith, East Longmeadow, MA (US); Ying She, Rocky Hill, CT (US); Stephanie Silberstein Bell, North Andover, MA (US); Richard Gentilman, Acton, MA (US)

(73) Assignee: RAYTHEON COMPANY, Tewksbury, MA (US)

( * ) Notice: Subject to any disclaimer, the term of this patent is extended or adjusted under 35 U.S.C. 154(b) by 0 days.

(21) Appl. No.: 18/083,204

(22) Filed: Dec. 16, 2022

(65) Prior Publication Data

US 2024/0199497 A1  Jun. 20, 2024

(51) Int. Cl.
 *C04B 35/628* (2006.01)
 *C04B 35/10* (2006.01)
 (Continued)

(52) U.S. Cl.
 CPC ........ *C04B 35/62823* (2013.01); *C04B 35/10* (2013.01); *C04B 35/48* (2013.01);
 (Continued)

(58) Field of Classification Search
 CPC .......................................... C04B 35/00–62897
 See application file for complete search history.

(56) References Cited

U.S. PATENT DOCUMENTS

| 7,247,589 B2 | 7/2007 | Krell et al. |
| 7,528,086 B2 | 5/2009 | Villalobos et al. |

(Continued)

FOREIGN PATENT DOCUMENTS

| BR | 102018007714 A2 | 11/2019 |
| CN | 101861243 A | 10/2010 |

(Continued)

OTHER PUBLICATIONS

Wu et al. "Synthesis of MgO Coating Gd2O3 Nanopowders for Consolidating Gd2O3-MgO Nanocomposite with Homogenous Phase Domain Distribution and High Mid-Infrared Transparency." Coatings 2022, 12, 1435. https://doi.org/ 10.3390/coatings12101435 Academic Editors: Emerson Coy and Luca Valentini Received: Aug. 10, 2022 Accepted: Sep. 26, 2022 Published: Sep. 29, 2022.

*Primary Examiner* — Alexandre F Ferre
(74) *Attorney, Agent, or Firm* — Kinney & Lange, P. A.

(57) ABSTRACT

A nanocomposite optical ceramic (NCOC) material includes a plurality of coated (core-shell) nanoparticles having nanoparticles of a first material coated with a coating of a second material. The first material and the second material are mutually insoluble and each have a transmissivity of at least 80% for an intended wavelength. The first material and the second material have a difference in index of refraction of less than 25%. The first material and second material have grins with a diameter of less than $\frac{1}{20}^{th}$ the intended wavelength. The coating of the second material on the nanoparticles of the first material is up to 50 nm thick. The NCOC contains no more than 0.01% voids per unit volume.

20 Claims, 1 Drawing Sheet

(51) Int. Cl.
*C04B 35/48* (2006.01)
*C04B 35/547* (2006.01)
*C04B 35/581* (2006.01)
*B82Y 40/00* (2011.01)

(52) U.S. Cl.
CPC .......... *C04B 35/547* (2013.01); *C04B 35/581* (2013.01); *C04B 35/62836* (2013.01); *C04B 35/62884* (2013.01); *B82Y 40/00* (2013.01); *C04B 2235/5454* (2013.01); *C04B 2235/781* (2013.01)

(56) References Cited

U.S. PATENT DOCUMENTS

| | | |
|---|---|---|
| 7,691,765 B2 | 4/2010 | Suzuki et al. |
| 7,914,617 B2 | 3/2011 | Yadav |
| 7,915,189 B2 | 3/2011 | Kobayashi et al. |
| 8,039,413 B2 | 10/2011 | Hollingsworth et al. |
| 8,105,509 B2 | 1/2012 | Sanghera et al. |
| 8,242,037 B2 | 8/2012 | Aine et al. |
| 8,277,878 B2 | 10/2012 | Sanghera et al. |
| 8,329,605 B2 | 12/2012 | Bernard-Granger et al. |
| 8,338,322 B2 | 12/2012 | Hollingsworth et al. |
| 8,445,822 B2 | 5/2013 | Sunne |
| 8,546,285 B2 | 10/2013 | Torrecillas San Millan et al. |
| 8,921,473 B1 | 12/2014 | Hyman |
| 8,956,517 B2 | 2/2015 | Sundara et al. |
| 9,012,823 B2 | 4/2015 | Sunne et al. |
| 9,040,157 B2 | 5/2015 | Hao et al. |
| 9,238,773 B2 | 1/2016 | Seeley et al. |
| 9,395,467 B2 | 7/2016 | Zelinski et al. |
| 9,470,915 B2 | 10/2016 | Makikawa et al. |
| 10,023,795 B2 | 7/2018 | Ning |
| 10,093,583 B2 | 10/2018 | Montanaro et al. |
| 10,513,462 B2 | 12/2019 | Feigelson et al. |
| 10,550,041 B1 | 2/2020 | Korenstein |
| 11,236,426 B2 | 2/2022 | Hamers et al. |
| 11,279,657 B2 | 3/2022 | Riedel et al. |
| 11,402,548 B2 | 8/2022 | Korenstein et al. |
| 2004/0156986 A1 | 8/2004 | Yadav |
| 2006/0084566 A1 | 4/2006 | Wan et al. |
| 2006/0100088 A1 | 5/2006 | Loureiro et al. |
| 2007/0049484 A1 | 3/2007 | Kear et al. |
| 2008/0108496 A1 | 5/2008 | Gratson et al. |
| 2010/0047180 A1 | 2/2010 | Zeng et al. |
| 2011/0315808 A1 | 12/2011 | Zelinski et al. |
| 2012/0119146 A1 | 5/2012 | Sanghera et al. |
| 2012/0119147 A1 | 5/2012 | Sanghera et al. |
| 2016/0068686 A1* | 3/2016 | Wahl .................... C09D 7/61 106/14.05 |
| 2017/0027168 A1 | 2/2017 | Heath |
| 2018/0341047 A1* | 11/2018 | Korenstein .......... C23C 14/083 |
| 2019/0245155 A1 | 8/2019 | Heath |
| 2022/0209499 A1* | 6/2022 | Zhou .................. H01S 5/02255 |
| 2022/0259107 A1 | 8/2022 | Smith et al. |

FOREIGN PATENT DOCUMENTS

| | | |
|---|---|---|
| CN | 101838391 B | 1/2012 |
| CN | 102690520 B | 5/2014 |
| CN | 104023711 A | 9/2014 |
| CN | 104067425 A | 9/2014 |
| CN | 103120923 B | 10/2014 |
| CN | 104403038 A | 3/2015 |
| CN | 104623682 A | 5/2015 |
| CN | 105566511 A | 5/2016 |
| CN | 104550941 B | 5/2017 |
| CN | 106619569 A | 5/2017 |
| CN | 104507458 B | 5/2018 |
| CN | 106238006 B | 9/2018 |
| CN | 106238007 B | 9/2018 |
| CN | 108993439 A | 12/2018 |
| CN | 109613090 A | 4/2019 |
| CN | 110819339 A | 2/2020 |
| CN | 108329417 B | 5/2020 |
| CN | 111100840 A | 5/2020 |
| CN | 107698757 B | 6/2020 |
| CN | 107158378 B | 2/2021 |
| CN | 108704144 B | 2/2021 |
| CN | 108815530 B | 8/2021 |
| CN | 113956041 A | 1/2022 |
| CN | 114025871 A | 2/2022 |
| FR | 3062126 A1 | 7/2018 |
| IN | 201941000403 A | 7/2020 |
| JP | 4789809 B2 | 7/2011 |
| JP | 4951184 B2 | 3/2012 |
| JP | 6072872 B2 | 1/2017 |
| JP | 2019190987 A | 10/2019 |
| JP | 6869173 B2 | 4/2021 |
| KR | 101239356 B1 | 3/2013 |
| KR | 101819091 B1 | 1/2018 |
| KR | 101865485 B1 | 6/2018 |
| WO | 2006091613 A2 | 8/2006 |
| WO | 2007011409 A2 | 1/2007 |
| WO | 2010048523 A2 | 4/2010 |
| WO | 2010071734 A1 | 6/2010 |
| WO | 2012099634 A1 | 7/2012 |
| WO | 2016159878 A1 | 10/2016 |
| WO | 2017074152 A1 | 5/2017 |
| WO | 2018217492 A1 | 11/2018 |
| WO | 2019045098 A1 | 3/2019 |
| WO | 2019111763 A1 | 6/2019 |
| WO | 2019225470 A1 | 11/2019 |
| WO | 2021021323 A1 | 2/2021 |

* cited by examiner

COATED (CORE-SHELL) NANOPARTICLES FOR NANOCOMPOSITE OPTICAL CERAMICS

BACKGROUND

The present disclosure relates generally to optical elements and, more particularly, to the fabrication of optical elements formed of nanocomposite optical ceramic (NCOC) materials.

NCOC materials have been developed for use in military optical imaging systems. NCOC materials have been used to form optical elements, including domes and windows, which can provide infrared (IR) transmittance while shielding imaging components from the external environment in which they are deployed. NCOC domes and windows have been successfully manufactured using near-net shape powder processing techniques. Nano-sized ceramic powders are formed in a mold and pressed to produce a green body having a general shape of the optical element but with increased thickness. The green bodies are then sintered to remove any organics added during powder processing and to achieve a high density (>96% of theoretical density). Finally, hot isostatic pressing (applying pressure and heat) to the sintered body forms a fully densified blank having a near-net shape of the optical element. Final shape finishing, including precision grinding and polishing, is provided to achieve a final shape of the optical element.

New compositions are desirable to provide more stable optical properties and enhanced mechanical integrity.

SUMMARY

A nanocomposite optical ceramic (NCOC) material includes a plurality of coated nanoparticles having nanoparticles of a first material coated with a coating of a second material. The first material and the second material are mutually insoluble and each have a transmissivity of at least 80% for an intended wavelength. The first material and the second material have a difference in index of refraction of less than 25%. The first material and second material have grains with a diameter of less than $\frac{1}{20}^{th}$ the intended wavelength. The coating of the second material on nanoparticles of the first material is up to 50 nm thick. The NCOC contains no more than 0.01% voids per unit volume.

A method for producing coated nanoparticles for use in a nanocomposite optical ceramic (NCOC) material includes providing a first quantity of uncoated nanoparticles of a first material and coating the first quantity of uncoated first material nanoparticles with a second material to form coated nanoparticles. The first material and the second material are mutually insoluble and each have a transmissivity of at least 80% for an intended wavelength. The first material and the second material have a difference in index of refraction of less than 25% and have grains with diameters of less than $\frac{1}{20}^{th}$ the intended wavelength. The second material coating on the first material nanoparticles is up to 50 nm thick. The coated nanoparticles are densified and sintered to form the NCOC material.

DETAILED DESCRIPTION

The present disclosure is directed to nanocomposite optical ceramic (NCOC) materials for optical system application including, but not limited to, electro-optical sensors used for target acquisition, identification, and guidance. Optical domes and windows generally must be transmissive in the infrared (IR) region of the electromagnetic spectrum and capable of protecting the electro-optical sensors and other components, which they shield, from harsh environmental conditions. NCOC materials have been shown to offer enhanced mechanical strength and thermal shock resistance in IR domes and windows, as well as lower emissivity even at elevated temperatures. Current NCOC elements, when subjected to high temperatures, experience grain growth. An increase in grain size decreases the transmissivity of the NCOC. As discussed in this disclosure, prior to sintering, the nanoparticles used to form the NCOC can be modified with the addition of a coating surrounding a least a portion of the nanoparticles to form coated nanoparticles, which can also be referred to as core-shell nanoparticles. The coating on the coated (core-shell) nanoparticles can inhibit grain growth. The NCOC materials described in this disclosure maintain grain size and transmissivity after being subjected to high temperatures, both in flight and during sintering.

As used in this disclosure, the term "nanocomposite optical ceramic (NCOC)" refers to a composite material formed of a mixture of ceramic nanoparticles that include mutually insoluble materials. As used in this disclosure, the term "nanoparticle" refers to particles having an average diameter of less than 1 μm. In some embodiments the nanoparticles of this disclosure have an average diameter of less than 20 nm, less than 10 nm, or less than 5 nm. In the context of this disclosure "diameter" means the largest dimension of the particle or grain without requiring a strictly circular cross-section. As used in this disclosure, the term "mutually insoluble" refers to nanoparticle materials that form a multi-phase grain structure having distinct phase separation between two constituents. The multi-phase grain structure remains distinct after processing such that separation between the phases can be observed. The NCOC materials of this disclosure are composite materials that have two or more different nanograin materials that are dispersed in one another. The different nanograins form material barriers to grain growth of the other and thereby inhibit grain growth during processing. Nanograins can be uniformly dispersed in the NCOC material. As used in this disclosure, the term "uniformly dispersed" refers to dispersion in a generally uniform manner such that spacing between nanograins of the same material is generally consistent throughout the NCOC material.

Figure 1:
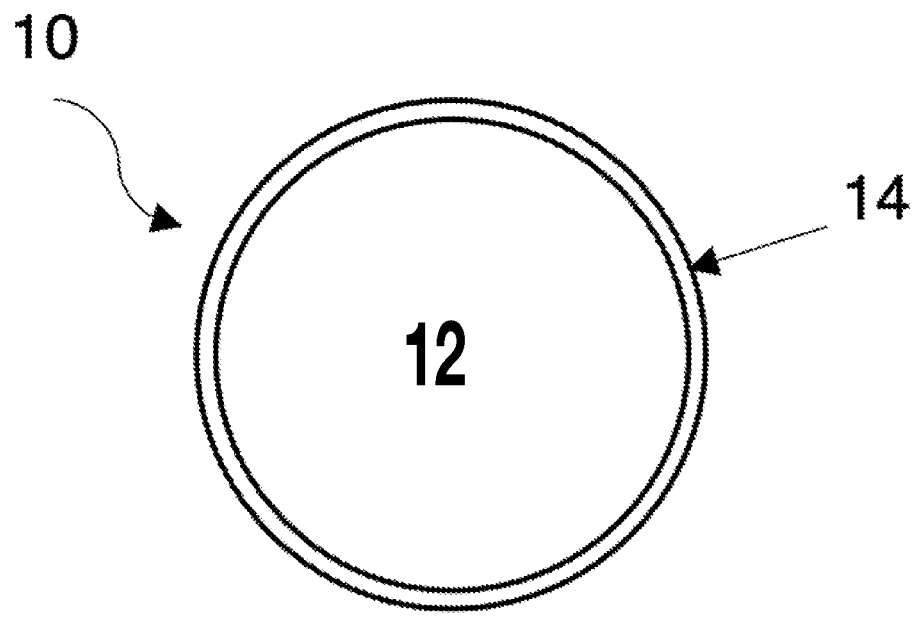
FIG. 1 is a schematic of a coated nanoparticle of the present disclosure.

FIG. 1 is a schematic of a coated nanoparticle 10 formed from a first material nanoparticle 12 coated with a second material 14. Coated nanoparticles 10 make up the bulk of the NCOC. After densification as described below, the NCOC comprises grains that are each smaller than the wavelength at which the NCOC is intended to be transparent (the "intended wavelength"). For certain applications, it may be desirable for the NCOC to be transparent to near infrared (NIR; 0.75 μm-1.4 μm wavelength), short wavelength infrared (SWIR; 1.4 μm-3 μm wavelength), middle wavelength infrared (MWIR; 3 μm-8.5 μm wavelength), long wavelength infrared (LWIR; 8 μm-12 μm wavelength), or possibly portions of the visible band (0.4 μm-0.75 μm wavelength). For example, the intended wavelength can be between 1.5 μm to 8.5 μm. In some embodiments the grain diameter in the densified NCOC is less than $\frac{1}{20}^{th}$ of the intended wavelength, less than $\frac{1}{25}^{th}$ of the intended wavelength, or less than $\frac{1}{30}^{th}$ of the intended wavelength. In some embodiments the grains in the densified NCOC are less than 175 nm, less than 160 nm, or less than 150 nm in diameter. The first material and second material are mutually insoluble and have a very similar index of refraction. In some embodiments the difference between the indexes of refraction is less than 25%, less than 20%, or less than 15%. The first material and second material can be oxides. In some embodiments the first material can be magnesium oxide (MgO) and the second material can be yttrium (III) oxide ($Y_2O_3$). In other embodiments, the first material can be $Y_2O_3$ and the second material can be MgO. As discussed below, MgO and $Y_2O_3$ are mutually insoluble. In yet other embodiments, other material pairs of mutually insoluble materials may be used as either the first material or the second material as appropriate for a particular application. Examples of other mutually insoluble material pairs useful as NCOC materials include: gallium arsenide (GaAs) and silicon (Si) as either the first material or the second material; aluminum oxide ($Al_2O_3$) and zirconium oxide ($ZrO_2$) as either the first material or the second material; aluminum nitride (AlN) and silicon (Si) as either the first material or the second material; and calcium lanthanum sulfide ($CaLa_2S_4$) and zinc sulfide (ZnS) as either the first material or the second material. The MgO and $Y_2O_3$ material pair as either the first material or the second material will be used as a non-limiting example throughout the rest of this disclosure.

Figure 2:
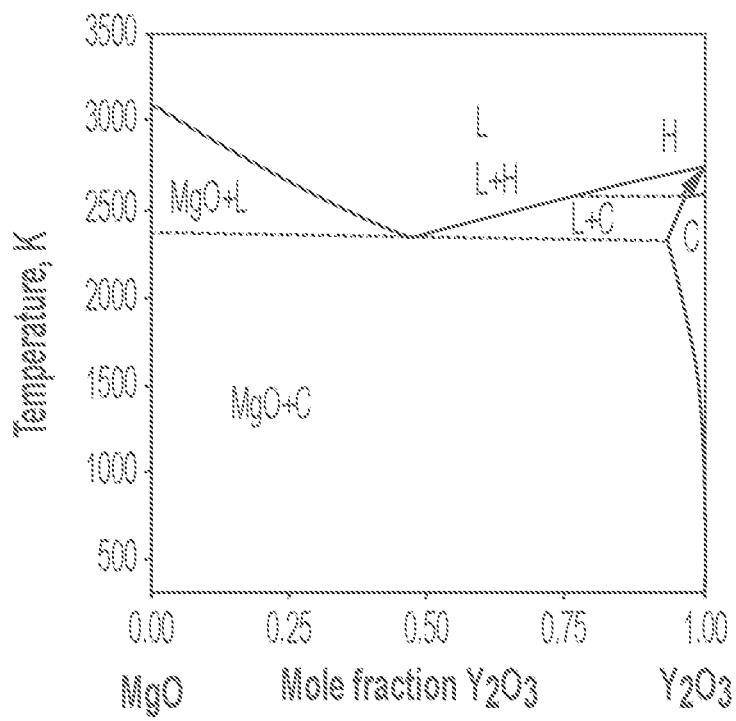
FIG. 2 is a phase diagram of magnesium oxide (MgO) and yttrium (III) oxide ($Y_2O_3$).

The NCOC materials can be used for optical system applications including, but not limited to, electro-optical sensors used for target acquisition, identification, and guidance on aircraft and missiles. Optical domes and windows must be capable of protecting the electro-optical sensors and other components from harsh environmental conditions, including heat from air friction. When on a flight trajectory, the temperature of the exterior of the domes and windows can reach as high as 1200° C. or higher. At these elevated temperatures, the size of nanoparticle grains can grow. The primary constituents of a NCOC may be two materials that are mutually insoluble. An exemplary embodiment is a NCOC composed of MgO and $Y_2O_3$. FIG. 2 shows the MgO—$Y_2O_3$ phase diagram, which shows that $Y_2O_3$ is insoluble in MgO up to the eutectic temperature (~2100° C.) and MgO has negligible solubility in $Y_2O_3$ below 1000° C. and less than 10% solubility up to $Y_2O_3$ melting point. In a single-phase system, grain boundary diffusion or bulk diffusion can occur during high temperature densification or plastic deformation, which causes grain growth. The change in grain size can alter optical and mechanical properties of the NCOC material. In mutually insoluble systems, there is no atomic transport (i.e., $Mg^{2+}$ ions do not freely move through the $Y_2O_3$ phase or vice versa), so grain growth is reduced with respect to a single phase material. A further reduction in grain growth can be obtained through the addition of a second material coating on NCOC first material nanoparticles. The addition of a second material coating creates a barrier to the growth of the NCOC first material nanoparticles, helping to maintain the desired grain size at higher temperatures. Coated NCOC nanoparticles described in this disclosure can have a transmissivity of 80% at a wavelength of 3 μm. When subjected to a temperature of 1400° C., 1500° C., or 1600° C. for 1 hour the coated NCOC nanoparticles will experience a grain growth of no greater than 20%.

The second material coating 14 can be applied to uncoated first material nanoparticles 12 by any method capable of providing uniform, pin-hole free, coating of a desired thickness. Useful coating methods include chemical vapor deposition and atomic layer deposition. Other methods currently known or later developed can also be used. Other techniques known to enhance the deposition of uniform, pin-hole free coatings, such as fluidized bed processing, can be used in conjunction with the selected coating method to produce coated nanoparticles 10. The second material coating 14 can be up to 50 nm thick. In some embodiments, the second material coating 14 can be between 10 nm and 20 nm thick. In yet other embodiments, the second material coating 14 can be 1 nm thick or thinner. In any case, the second material coating 14 should be thick enough to inhibit growth of grains in the first material nanoparticles 12 when the NCOC is exposed to operating temperatures of 1200° C. or higher.

The first material and second material nanoparticles (as described below) useful with the NCOC of the present disclosure can be formed using powder processing techniques or other methods known in the art capable of forming a densified, multi-phase NCOC material. Powder processing can include powder fabrication and preparation, densification, and finishing. Powder precursors are used with flame spray pyrolysis (FSP) or other powder production methods to form the desired nanoparticles. NCOC nanoparticles formed using a FSP process can have high purity with controlled nanoparticle size and crystallinity. A slurry containing nanoparticles formed from FSP can be ground and mixed, for example, in a mill or similar device, to break up agglomerates of material. The slurry can be filtered to remove impurities and/or particles exceeding a maximum desired particle size. Liquid can be removed from solution and the nanoparticles can be dried in a granulation step.

The NCOC of the present disclosure can be formed entirely of coated nanoparticles 10 as described above. In such an embodiment, the second material coating 14 can form continuous or semi-continuous bands of the second material when the coated nanoparticles 10 are densified into the NCOC. In some embodiments, the NCOC can include additional amounts (i.e., a second quantity) of uncoated first material nanoparticles and an amount of uncoated second material nanoparticles. In such embodiments, the additional amounts of uncoated first material nanoparticles and uncoated second material nanoparticles will have particle sizes equivalent to the coated nanoparticles 10 also used included in the NCOC. For example, some embodiments can be formed from at least 80% by volume of coated nanoparticles 10 with the balance being a mixture of uncoated first material nanoparticles and uncoated second material nanoparticles. Other embodiments can be formed from at least 90% or at least 95% by volume of coated nanoparticles 10 with the balance being a mixture of uncoated first material nanoparticles and uncoated second material nanoparticles. In NCOCs of the present disclosure that include additional amounts of uncoated first material nanoparticles and uncoated second material nanoparticles, the relative amounts of uncoated first material nanoparticles and uncoated second material nanoparticles can be roughly equal or can be skewed to include either more uncoated first material nanoparticles or more uncoated second material nanoparticles as appropriate for a particular application. If additional amounts of uncoated first material nanoparticles and uncoated second material nanoparticles are used to form a NCOC as described in this disclosure, the resulting NCOC may include coated nanoparticles 10 dispersed in and/or surrounded by a multi-phase NCOC material comprising grains of the first material and the second material.

To form a near-net shape NCOC, desired amounts of coated nanoparticles 10 and additional amounts of uncoated first material nanoparticles and uncoated second material nanoparticles (if any) can be dry pressed and compacted (i.e., densified) into a mold of suitable size and shape to reduce voids. The compacted nanoparticles can be sintered to form a densified molded compact. Sintering can increase the density of the molded compact to greater than about 96% of theoretical density. Final densification can be achieved by applying a hot isostatic press (HIP) to eliminate any remaining voids and provide a fully dense NCOC. In the context of this disclosure "fully dense" means no more than 0.01% voids per unit volume. Final finishing, including grinding and polishing, can be provided as needed. Grain size of NCOC material can be measured and/or characterization of the optical and mechanical properties of the NCOC can be conducted to verify that the optical and mechanical properties of the NCOC meet the material specifications for the optical element. The NCOC of this disclosure can be formed into an optical element of any size and shape, including but not limited to disks, hemispherical and ogive domes, lenses, flats, and windows of various sizes (e.g., a few centimeters (cm) in diameter and/or length up to tens of cm in diameter and/or length).

DISCUSSION OF POSSIBLE EMBODIMENTS

The following are non-exclusive descriptions of possible embodiments of the present invention.

A nanocomposite optical ceramic (NCOC) material includes a plurality of coated nanoparticles having nanoparticles of a first material coated with a coating of a second material. The first material and the second material are mutually insoluble and each have a transmissivity of at least 80% for an intended wavelength. The first material and the second material have a difference in index of refraction of less than 25%. The first material and second material have grains with a diameter of less than $\frac{1}{20}^{th}$ the intended wavelength. The second material coating on the first material nanoparticles is up to 50 nm thick. The NCOC contains no more than 0.01% voids per unit volume.

The NCOC of the preceding paragraph can optionally include, additionally and/or alternatively, any one or more of the following features, configurations and/or additional components:

A further embodiment of the foregoing NCOC, wherein the NCOC comprises at least 80% by volume of the plurality of coated nanoparticles and the balance of the NCOC comprises a plurality of uncoated nanoparticles of the first material having grains no larger than $\frac{1}{20}^{th}$ the intended wavelength and a plurality of uncoated nanoparticles of the second material having grains no larger than $\frac{1}{20}^{th}$ the intended wavelength.

A further embodiment of the foregoing NCOC, wherein the NCOC comprises at least 90% by volume of the plurality of coated nanoparticles and the balance of the NCOC comprises the plurality of uncoated nanoparticles of the first material having grains no larger than $\frac{1}{20}^{th}$ the intended wavelength and the plurality of uncoated nanoparticles of the second material having grains no larger than $\frac{1}{20}^{th}$ the intended wavelength.

A further embodiment of the foregoing NCOC, wherein the NCOC comprises at least 95% by volume of the plurality of coated nanoparticles and the balance of the NCOC comprises the plurality of uncoated nanoparticles of the first material having grains no larger than $\frac{1}{20}^{th}$ the intended wavelength and the plurality of uncoated nanoparticles of the second material having grains no larger than $\frac{1}{20}^{th}$ the intended wavelength.

A further embodiment of the foregoing NCOC, wherein the NCOC comprises up to 100% by volume of the plurality of coated nanoparticles.

A further embodiment of any of the foregoing NCOC, wherein the first material comprises magnesium oxide (MgO) and the second material comprises yttrium (III) oxide ($Y_2O_3$) or the first material comprises $Y_2O_3$ and the second material comprises MgO.

A further embodiment of any of the foregoing NCOC, wherein the first material comprises gallium arsenide (GaAs) and the second material comprises silicon (Si) or the first material comprises Si and the second material comprises GaAs.

A further embodiment of any of the foregoing NCOC, wherein the first material comprises aluminum oxide ($Al_2O_3$) and the second material comprises zirconium oxide ($ZrO_2$) or the first material comprises $ZrO_2$ and the second material comprises $Al_2O_3$.

A further embodiment of any of the foregoing NCOC, wherein the first material comprises aluminum nitride (AlN) and the second material comprises silicon (Si) or the first material comprises Si and the second material comprises AlN.

A further embodiment of any of the foregoing NCOC, wherein the first material comprises calcium lanthanum sulfide ($CaLa_2S_4$) and the second material comprises zinc sulfide (ZnS) or the first material comprises ZnS and the second material comprises $CaLa_2S_4$.

A method for producing coated nanoparticles for use in a nanocomposite optical ceramic (NCOC) material includes providing a first quantity of uncoated nanoparticles of a first material and coating the first quantity of uncoated first material nanoparticles with a second material to form coated nanoparticles. The first material and the second material are mutually insoluble and each have a transmissivity of at least 80% for an intended wavelength. The first material and the second material have a difference in index of refraction of less than 25% and have grains with diameters of less than $\frac{1}{20}^{th}$ the intended wavelength. The second material coating on the first material nanoparticles is up to 50 nm thick. The coated nanoparticles are densified and sintered to form the NCOC material.

The method of the preceding paragraph can optionally include, additionally and/or alternatively, any one or more of the following features, configurations and/or additional components:

A further embodiment of the foregoing method, wherein the second material coating is applied to the first material nanoparticles by chemical vapor deposition or atomic layer deposition.

A further embodiment of any of the foregoing methods, wherein the first material comprises magnesium oxide (MgO) and the second material comprises yttrium (III) oxide ($Y_2O_3$) or the first material comprises $Y_2O_3$ and the second material comprises MgO.

A further embodiment of any of the foregoing methods, wherein the first material comprises gallium arsenide (GaAs) and the second material comprises silicon (Si) or the first material comprises Si and the second material comprises GaAs.

A further embodiment of any of the foregoing methods, wherein the first material comprises aluminum oxide ($Al_2O_3$) and the second material comprises zirconium oxide ($ZrO_2$) or the first material comprises $ZrO_2$ and the second material comprises $Al_2O_3$.

A further embodiment of any of the foregoing methods, wherein the first material comprises aluminum nitride (AlN) and the second material comprises silicon (Si) or the first material comprises Si and the second material comprises AlN.

A further embodiment of any of the foregoing methods, wherein the first material comprises calcium lanthanum sulfide ($CaLa_2S_4$) and the second material comprises zinc sulfide (ZnS) or the first material comprises ZnS and the second material comprises $CaLa_2S_4$.

A further embodiment of any of the foregoing methods, further including: providing a second quantity of uncoated first material nanoparticles, wherein the second quantity of first material uncoated nanoparticles have grains with diameters of less than $\frac{1}{20}^{th}$ the intended wavelength; providing uncoated second material nanoparticles, wherein the uncoated second material nanoparticles have grains with diameters of less than $\frac{1}{20}^{th}$ the intended wavelength; mixing the coated nanoparticles, the second quantity of uncoated first material nanoparticles, and the uncoated second material nanoparticles; dry pressing and compacting the mixture of the coated nanoparticles, the second quantity of uncoated first material nanoparticles, and the uncoated second material nanoparticles; sintering the dry pressed and compacted mixture of the coated nanoparticles, the second quantity of uncoated first material nanoparticles, and the uncoated second material nanoparticles to form a densified molded compact; and hot isostatic pressing the densified molded compact to form the NCOC material such that the NCOC material comprises at least 80% by volume of the coated nanoparticles.

A further embodiment of the foregoing method, wherein the NCOC material comprises at least 90% by volume of the coated nanoparticles.

A further embodiment of the foregoing method, wherein the NCOC material comprises at least 95% by volume of the coated nanoparticles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nanocomposite optical ceramic (NCOC) material comprising:
   a plurality of coated nanoparticles comprising nanoparticles of a first material coated with a coating of a second material, wherein:
      the first material and the second material are mutually insoluble;
      the first material and the second material each have a transmissivity of at least 80% for an intended wavelength;
      the first material and the second material have a difference in index of refraction of less than 25%;
      the first material and the second material have grains with a diameter of less than $\frac{1}{20}^{th}$ the intended wavelength;
      the coating of the second material on the nanoparticles of the first material is up to 50 nm thick; and
      the NCOC material contains no more than 0.01% voids per unit volume following dry pressing and compacting, sintering, and hot isostatic pressing;
   wherein the first material and the second material are selected to limit NCOC grain growth such that the NCOC exhibits grain growth of no greater than 20% when exposed to a temperature of −1400° C. to 1600° C. for one hour.

2. The NCOC of claim 1, wherein the NCOC comprises at least 80% by volume of the plurality of coated nanoparticles and the balance of the NCOC comprises a plurality of uncoated nanoparticles of the first material having grains no larger than $\frac{1}{20}^{th}$ the intended wavelength and a plurality of uncoated nanoparticles of the second material having grains no larger than $\frac{1}{20}^{th}$ the intended wavelength.

3. The NCOC of claim 2, wherein the NCOC comprises at least 90% by volume of the plurality of coated nanoparticles and the balance of the NCOC comprises the plurality of uncoated nanoparticles of the first material having grains no larger than $\frac{1}{20}^{th}$ the intended wavelength and the plurality of uncoated nanoparticles of the second material having grains no larger than $\frac{1}{20}^{th}$ the intended wavelength.

4. The NCOC of claim 2, wherein the NCOC comprises at least 95% by volume of the plurality of coated nanoparticles and the balance of the NCOC comprises the plurality of uncoated nanoparticles of the first material having grains no larger than $\frac{1}{20}^{th}$ the intended wavelength and the plurality of uncoated nanoparticles of the second material having grains no larger than $\frac{1}{20}^{th}$ the intended wavelength.

5. The NCOC of claim 2, wherein the NCOC comprises up to 100% by volume of the plurality of coated nanoparticles.

6. The NCOC of claim 1, wherein the first material comprises magnesium oxide (MgO) and the second material comprises yttrium (III) oxide ($Y_2O_3$) or the first material comprises $Y_2O_3$ and the second material comprises MgO.

7. The NCOC of claim 1, wherein the first material comprises gallium arsenide (GaAs) and the second material comprises silicon (Si) or the first material comprises Si and the second material comprises GaAs.

8. The NCOC of claim 1, wherein the first material comprises aluminum oxide ($Al_2O_3$) and the second material comprises zirconium oxide ($ZrO_2$) or the first material comprises $ZrO_2$ and the second material comprises $Al_2O_3$.

9. The NCOC of claim 1, wherein the first material comprises aluminum nitride (AlN) and the second material comprises silicon (Si) or the first material comprises Si and the second material comprises AlN.

10. The NCOC of claim 1, wherein the first material comprises calcium lanthanum sulfide ($CaLa_2S_4$) and the second material comprises zinc sulfide (ZnS) or the first material comprises ZnS and the second material comprises $CaLa_2S_4$.

11. A method for producing coated nanoparticles for use in a nanocomposite optical ceramic (NCOC) material, the method comprising:
    providing a first quantity of uncoated nanoparticles of a first material;
    coating the first quantity of uncoated first material nanoparticles with a second material to form coated nanoparticles, wherein:

the first material and the second material are mutually insoluble;

the first material and the second material each have a transmissivity of at least 80% for an intended wavelength;

the first material and the second material have a difference in index of refraction of less than 25%;

the first material and second material have grains with diameters of less than $\frac{1}{20}^{th}$ the intended wavelength;

the second material coating on the first material nanoparticles is up to 50 nm thick; and dry pressing and compacting, sintering, and hot isostatic pressing the coated nanoparticles to form the NCOC material, wherein the NCOC material contains no more than 0.01% voids per unit volume;

wherein the first material and the second material are selected to limit NCOC grain growth such that the NCOC exhibits grain growth of no greater than 20% when exposed to a temperature of −1400° C. to 1600° C. for one hour.

12. The method of claim 11, wherein the second material coating is applied to the first material nanoparticles by chemical vapor deposition or atomic layer deposition.

13. The method of claim 11, wherein the first material comprises magnesium oxide (MgO) and the second material comprises yttrium (III) oxide ($Y_2O_3$) or the first material comprises $Y_2O_3$ and the second material comprises MgO.

14. The method of claim 11, wherein the first material comprises gallium arsenide (GaAs) and the second material comprises silicon (Si) or the first material comprises Si and the second material comprises GaAs.

15. The method of claim 11, wherein the first material comprises aluminum oxide ($Al_2O_3$) and the second material comprises zirconium oxide ($ZrO_2$) or the first material comprises $ZrO_2$ and the second material comprises $Al_2O_3$.

16. The method of claim 11, wherein the first material comprises aluminum nitride (AlN) and the second material comprises silicon (Si) or the first material comprises Si and the second material comprises AlN.

17. The method of claim 11, wherein the first material comprises calcium lanthanum sulfide ($CaLa_2S_4$) and the second material comprises zinc sulfide (ZnS) or the first material comprises ZnS and the second material comprises $CaLa_2S_4$.

18. The method of claim 11, further comprising:

providing a second quantity of uncoated first material nanoparticles, wherein the second quantity of first material uncoated nanoparticles have grains with diameters of less than $\frac{1}{20}^{th}$ the intended wavelength;

providing uncoated second material nanoparticles, wherein the uncoated second material nanoparticles have grains with diameters of less than $\frac{1}{20}^{th}$ the intended wavelength;

mixing the coated nanoparticles, the second quantity of uncoated first material nanoparticles, and the uncoated second material nanoparticles;

dry pressing and compacting the mixture of the coated nanoparticles, the second quantity of uncoated first material nanoparticles, and the uncoated second material nanoparticles;

sintering the dry pressed and compacted mixture of the coated nanoparticles, the second quantity of uncoated first material nanoparticles, and the uncoated second material nanoparticles to form a densified molded compact; and hot isostatic pressing the densified molded compact to form the NCOC material such that the NCOC material comprises at least 80% by volume of the coated nanoparticles.

19. The method of claim 18, wherein the NCOC material comprises at least 90% by volume of the coated nanoparticles.

20. The method of claim 18, wherein the NCOC material comprises at least 95% by volume of the coated nanoparticles.

* * * * *